No. 893,627. PATENTED JULY 21, 1908.
J. E. HOSMER.
WALKING HAND CULTIVATOR.
APPLICATION FILED SEPT. 27, 1907.
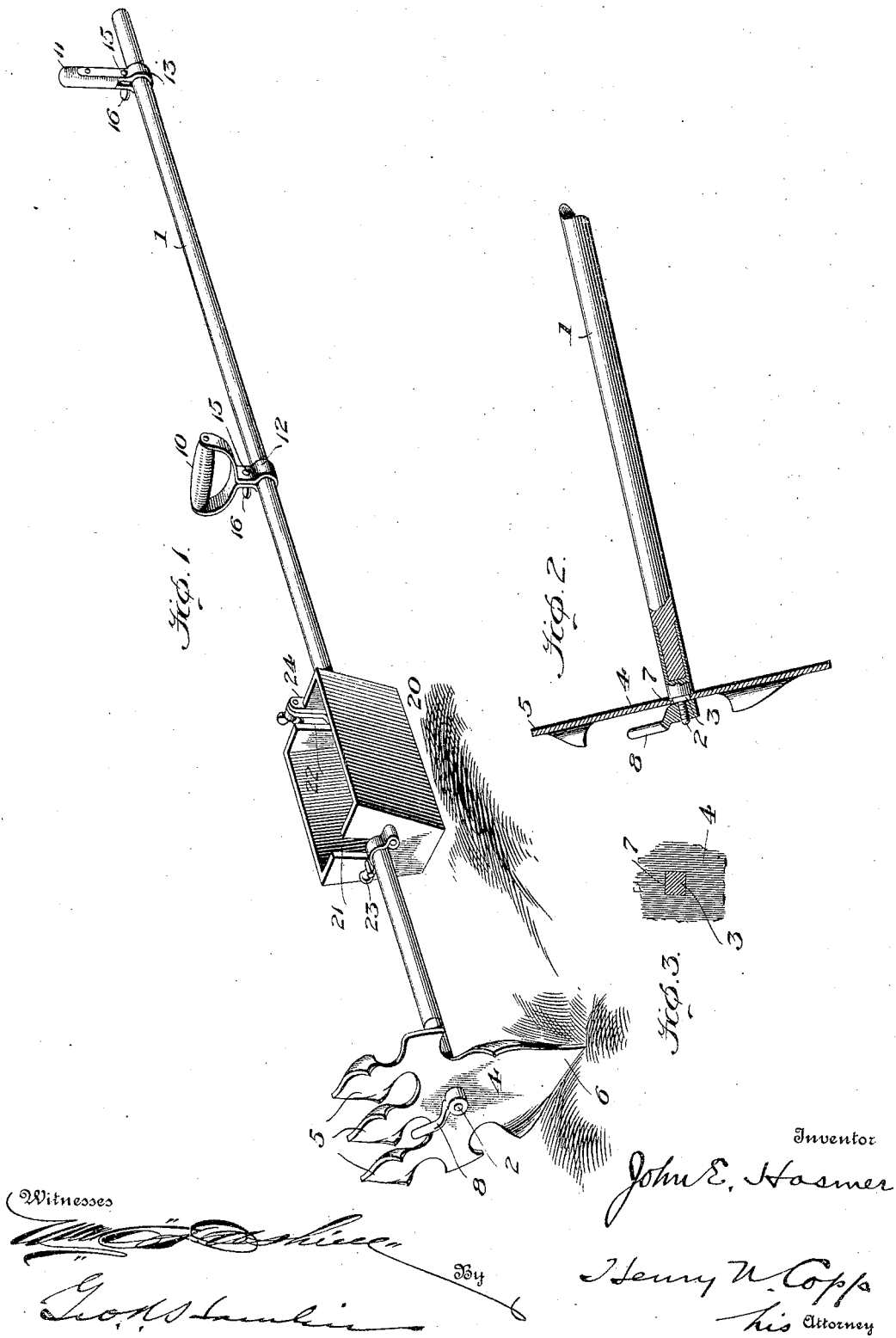
Inventor
John E. Hosmer
Witnesses
By Henry N. Copp
his Attorney

UNITED STATES PATENT OFFICE.

JOHN E. HOSMER, OF SILVERTON, OREGON.

WALKING HAND-CULTIVATOR.

No. 893,627.  Specification of Letters Patent.  Patented July 21, 1908.

Application filed September 27, 1907. Serial No. 394,862.

*To all whom it may concern:*

Be it known that I, JOHN E. HOSMER, a citizen of the United States, residing at Silverton, county of Marion, and State of Oregon, have invented certain new and useful Improvements in Walking Hand-Cultivators, of which the following is a specification.

My invention relates to walking hand cultivators.

The invention has for its objects the provision of a walking hand cultivator adapted for use for deep cultivation, the same as by a horse cultivator, having means for adjustably weighting it to cause it to cultivate as deeply as desired; to provide in a walking hand cultivator a novel arrangement of different cultivating blades, adjustably secured so that any one may be brought into operating position; to provide a shank having a novel arrangement of handles capable of adjustment so that the device may be used with the operator facing the blades, or on the other hand, turned from them; and, generally, the invention has for its object the provision of a novel walking hand cultivator adapted for use in the different kinds of hilling, drilling, leveling, weeding, etc.

The invention is set forth fully hereinafter and its novel features are recited in the appended claims.

In the accompanying drawings:—Figure 1 is a perspective of the invention; Fig. 2, a detail section of the cultivator blade and part of the handle, and Fig. 3, a detail of the means for holding the blade against rotation.

The cylindrical shank 1 is of sufficient length for use by a man standing, as the implement is designed for vigorous as well as light cultivation and is not merely a hand tool for scratching the surface. At the lower end of this handle is a screw-threaded tang 2 having a squared part 3. The blade 4 is composite and at various parts it may have any desired shape so as to be capable of many various uses. As shown, this blade has a plurality of small points or shovels 5, and a large shovel 6 disposed opposite the small shovels. The blade has a squared aperture 7 adapted to fit over the squared part 3 to hold it rigid. A handle nut 8 is provided on the screwthreaded part 2 for the purpose of holding the blade securely on the squared part 3 in whatever position it may be adjusted, it being understood that by loosening the handle nut, the blade may be slipped off of the squared part 3, turned to the desired position relatively to the handle, and slipped back on said squared part and the handle tightened. Obviously, any part of the blade may thus be brought lowermost for use, and I therefore, provide in a single implement, a desired variety of hilling, drilling, leveling, weeding, etc., devices, capable of independent use.

There are two handles 10 and 11 which have clamping straps 12 and 13 encircling the handle or shank 1 at different points and adapted for tightening to secure the handles where adjusted, by screw-bolts and wing nuts 15 and 16. Means are thus provided for bringing the handles independently to desired positions and angles so that they may be adjusted to suit the work and the reach of the operator and also made suitable to be grasped whether he is facing the blade or is pulling the implement after him.

The numeral 20 designates a box or receptacle having slots 21 and 22 to receive the shank 1 and permit adjustment of the box lengthwise thereof or its removal. Clamps 23 and 24, carried by the box, hold it on the shank at any desired point. Suitable weights are placed in the box, the amount of which vary according to the soil being worked, twenty-five pounds being about the average used for ordinary work and with this weight the work is easy and results very satisfactory. The purpose of the weight is to sink the blade or blades deeply in the soil without requiring downward pressure by the operator so that he may devote himself to directing the movements of the implement, the capacity for varying the amount of weight imposed being very valuable as it insures the requisite deep cultivation without imposing extra effort on the part of the operator and enables him to carry on as satisfactory work as may be done with a horse cultivator.

The device can be turned over and used without rotating the blade on the shank, the handles 10 and 11 being adjusted accordingly, the clamps 23 and 24 being first loosened so that the shank 1 may be turned within said clamps without disturbing the box.

Having thus described my invention, what I claim as new and desire to secure by Letters Patent, is:—

1. In a walking hand cultivator, the combination with a shank and a reversible cultivator blade carried thereby, of a weight containing box, and means connecting the box to the said shank permitting rotation of the shank and reversal of the blade relative to the box without turning the box.

2. In a walking hand cultivator, the combination with a shank, and a reversible blade carried thereby, of a weight containing box, and releasable clamps suspending said box from the shank and permitting adjustment of said box to different positions lengthwise on the shank and also rotation of the shank in said clamps and reversal of the blade without turning the box.

In testimony whereof, I hereunto affix my signature in presence of two witnesses.

JOHN E. HOSMER.

Witnesses:
MILLORD A. SEITZ,
LOUIS E. RAUCH.